United States Patent [19]
Nakano

[11] Patent Number: 5,136,891
[45] Date of Patent: Aug. 11, 1992

[54] CONTINUOUSLY VARIABLE TRACTION ROLLER TRANSMISSION

[75] Inventor: Masaki Nakano, Kanagawa Pref., Japan

[73] Assignee: Nissan Motor Co., Ltd., Yokohama, Japan

[21] Appl. No.: 702,374

[22] Filed: May 20, 1991

[30] Foreign Application Priority Data

May 22, 1990 [JP] Japan .................................. 2-131945

[51] Int. Cl.⁵ .............................................. F16H 15/00
[52] U.S. Cl. ........................................ 74/190.5; 74/200
[58] Field of Search ............................ 74/190.5, 200

[56] References Cited

U.S. PATENT DOCUMENTS

| | | | |
|---|---|---|---|
| 3,570,317 | 3/1971 | Kraus | 74/200 |
| 4,444,068 | 4/1984 | Kraus | 74/200 |
| 4,576,055 | 3/1986 | Kraus | 74/190.5 X |
| 4,718,294 | 1/1988 | Okoshi | 74/200 X |
| 4,830,578 | 5/1989 | Kraus | 74/190.5 X |
| 4,911,030 | 3/1990 | Kraus | 74/190.5 X |
| 4,960,004 | 10/1990 | Hibi et al. | 74/200 |

FOREIGN PATENT DOCUMENTS

| | | |
|---|---|---|
| 0373650 | 6/1990 | European Pat. Off. . |
| 0394944 | 10/1990 | European Pat. Off. . |
| 63-92859 | 6/1963 | Japan . |
| 62-128262 | 8/1987 | Japan . |

OTHER PUBLICATIONS

Patent Abstracts of Japan, vol. 12, No. 378 (M-751) (3225) 11 Oct. 1988 & JP-A-63 130954.
Patent Abstracts of Japan, vol. 10, No. 307 (M-527) (2363) 18 Oct. 1986, & JP-A-61 119866.

*Primary Examiner*—Allan D. Herrmann
*Assistant Examiner*—David W. Laub
*Attorney, Agent, or Firm*—Foley & Lardner

[57] ABSTRACT

A continuously variable traction roller transmission comprises a casing, a hydraulic cylinder apparatus for moving each pair of roller supporting members in an axial direction of rotation shanks, and a control valve apparatus for adjusting hydraulic pressure to be supplied to the hydraulic cylinder apparatus. A cylinder body of the hydraulic cylinder apparatus and a valve body of the control valve apparatus are mounted to the casing separately, and not connected directly to each other.

4 Claims, 5 Drawing Sheets

CONTINUOUSLY VARIABLE TRACTION ROLLER TRANSMISSION

BACKGROUND OF THE INVENTION

The present invention relates to a continuously variable traction roller transmission.

Various kinds of continuously variable traction roller transmissions have been proposed up to the present. One of such continuously variable traction roller transmissions is disclosed, for example, in JP-U 62-128262, or JP-U 63-92859. This transmission includes a member integrated with a valve body which has a piston bore for receiving a piston of a hydraulic cylinder apparatus. Specifically, the valve body, which has a spool bore for receiving a plurality of spools, has also the piston bore.

With such known continuously variable traction roller transmissions, however, the valve body receiving a piston undergoes a great force due to reaction of hydraulic pressure operating on the piston. When undergoing a great force, the valve body will be deformed elastically, causing also deformation of the spool bore for receiving a plurality of spools. This results in obstruction of smooth operation of the spool(s), assuming a situation susceptible of occurrence of so-called valve sticking.

SUMMARY OF THE INVENTION

It is, therefore, an object of the present invention to provide a continuously variable traction roller transmission which is constructed to prevent a valve body of a control valve apparatus from undergoing a great force.

It is another object of the present invention to provide a continuously variable traction roller transmission which is constructed to prevent valve sticking in a spool bore of the valve body.

According to one aspect of the present invention, there is provided a continuously variable traction roller transmission, comprising a casing, input and output discs disposed within said casing, a pair of traction rollers arranged between a toroidal concavity defined by said input and output discs for frictional engagement therewith, a pair of roller supporting members for said pair of traction rollers, each having rotation shanks and being rotatable thereon and movable in an axial direction thereof, a hydraulic cylinder apparatus so constructed and arranged as to move each of said pair of roller supporting members in said axial direction of said rotation shanks, said hydraulic cylinder apparatus having a cylinder body, said cylinder body being fixedly mounted to said casing on one portion thereof, and a control valve apparatus so constructed and arranged as to adjust hydraulic pressure to be supplied to said hydraulic cylinder apparatus, said control valve apparatus having a valve body, said valve body being fixedly mounted to said casing on the other portion thereof.

According to another aspect of the present invention, there is provided a continuously variable traction roller transmission, comprising a casing, input and output discs disposed within said casing, a pair of traction rollers arranged between a toroidal concavity defined by said input and output discs for frictional engagement therewith, a pair of roller supporting members for said pair of traction rollers, each having rotation shanks and being rotatable thereon and movable in an axial direction thereof;

a hydraulic cylinder apparatus so constructed and arranged as to move each of said pair of roller supporting members in said axial direction of said rotation shanks, said hydraulic cylinder apparatus having a cylinder body; a control valve apparatus so constructed and arranged as to adjust hydraulic pressure to be supplied to said hydraulic cylinder apparatus, said control valve apparatus having a valve body, said valve body being fixedly mounted to said cylinder body of said hydraulic cylinder apparatus; and means for defining a clearance between said cylinder body of said hydraulic cylinder apparatus and said valve body of said control valve apparatus in the vicinity of said piston bore of said cylinder body.

DETAILED DESCRIPTION OF THE INVENTION

Figure 1:
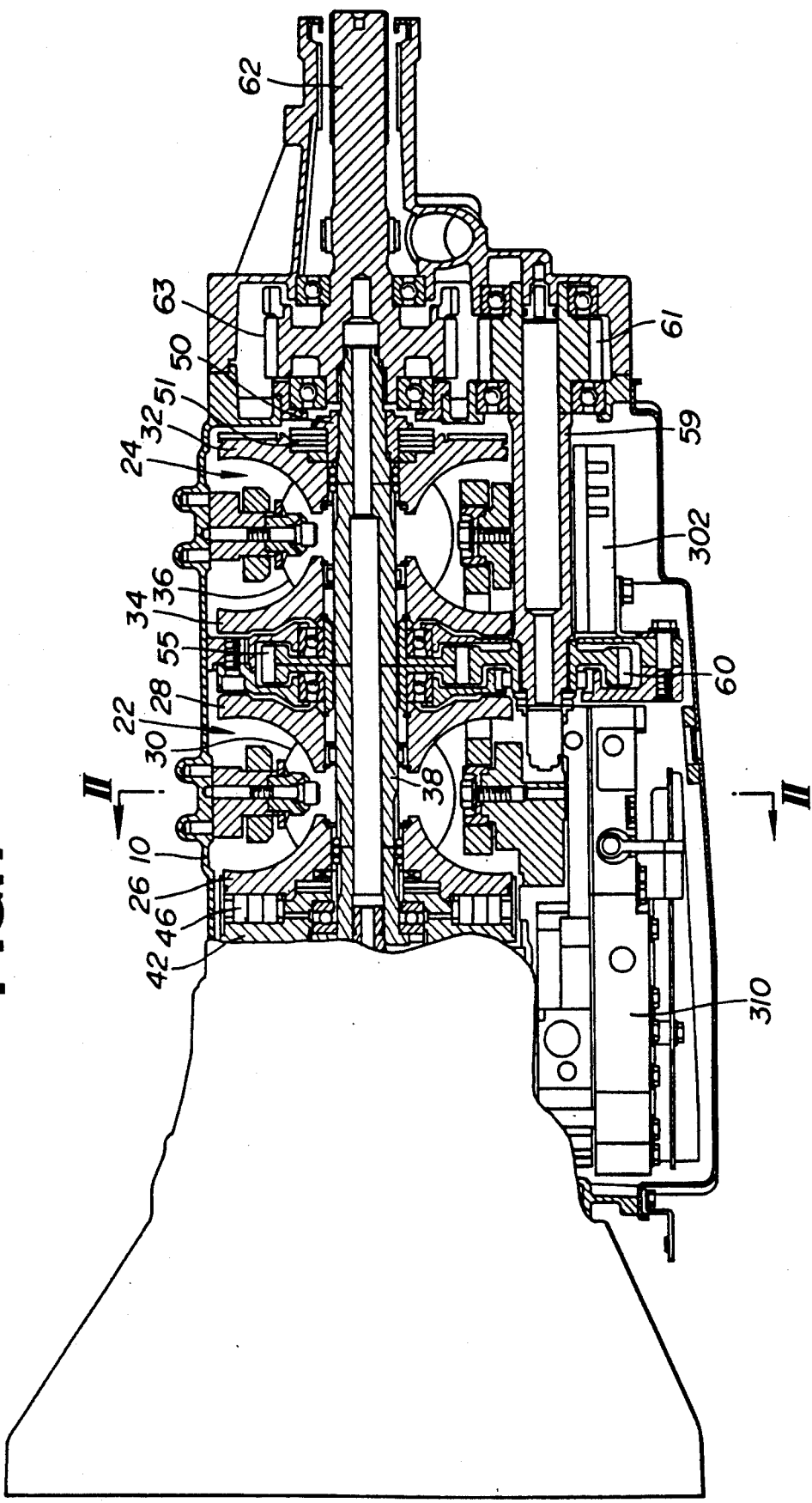
FIG. 1 is a longitudinal section illustrating a first preferred embodiment of a continuously variable traction roller transmission according to the present invention.

Referring to FIGS. 1 to 4, particularly to FIG. 1, a continously variable traction roller transmission embodying the present invention includes a first continuously variable transmission unit 22, and a second continuously variable transmission unit 24 within a casing 10. The first continuously variable transmission unit 22 includes an input disc 26, an output disc 28, and a pair of traction rollers 30 for transmitting torque between the two. The input disc 26 and the output disc 28 have a contact surface with the traction rollers 30 in the shape of a toroid, respectively. A rotational speed ratio of the input disc 26 and the output disc 28 can be continuously changed by altering a contact state of the input disc 26 and the output disc 28 with the traction rollers 30. Similarly, the second continuously variable transmission unit 24 includes an input disc 32, an output disc 34, and a pair of traction rollers 36. It is to be noted that the input and output discs 32, 34 of the second transmission unit 34 are arranged contrary to the input and output discs 26, 28 of the first transmission unit 22. That is, the two output discs 28 and 34 are arranged to be adjacent to each other. The input disc 26 is supported by an input shaft 38 at the outer periphery thereof through a ball spline. The input shaft 38 is operatively connected to a forward and reverse drive change-over mechanism, and a torque converter (not shown), thereby to receive engine torque. A cam flange 42 is arranged at the back of the input disc 26. A cam roller 46 is arranged between cam surfaces of the cam flange 42 and the input disc 26 which face each other. The cam roller 46 is so shaped as to generate a force to bias the input disc 26 toward the output disc 28 upon relative rotation between the input disc 26 and the cam flange 42. Similarly, the input disc 32 of the second continuously variable transmission unit 24 is connected to the input disc 38 through a ball spline. The input disc 32 undergoes a force toward the output disc 34 from a dish plate 51 which in turn undergoes a compression from a loading nut 50 screwed to the input shaft 38. The output discs 28 and 34 of the first and second continuously variable transmission units 22 and 24 are rotatably supported on the input shaft 38 through needle bearings, respectively. A driving gear 55 is arranged to make unitary rotation with the output discs 28 and 34. The driving gear 55 is engaged with a follower 60 which is operatively connected to one end of a countershaft 59 arranged in parallel with the input shaft 38. A gear 61 as integrated with the countershaft 59 at the other end thereof is engaged with a gear 63 which is integrated with the output shaft 62 through an idler gear (not shown).

Figure 2:
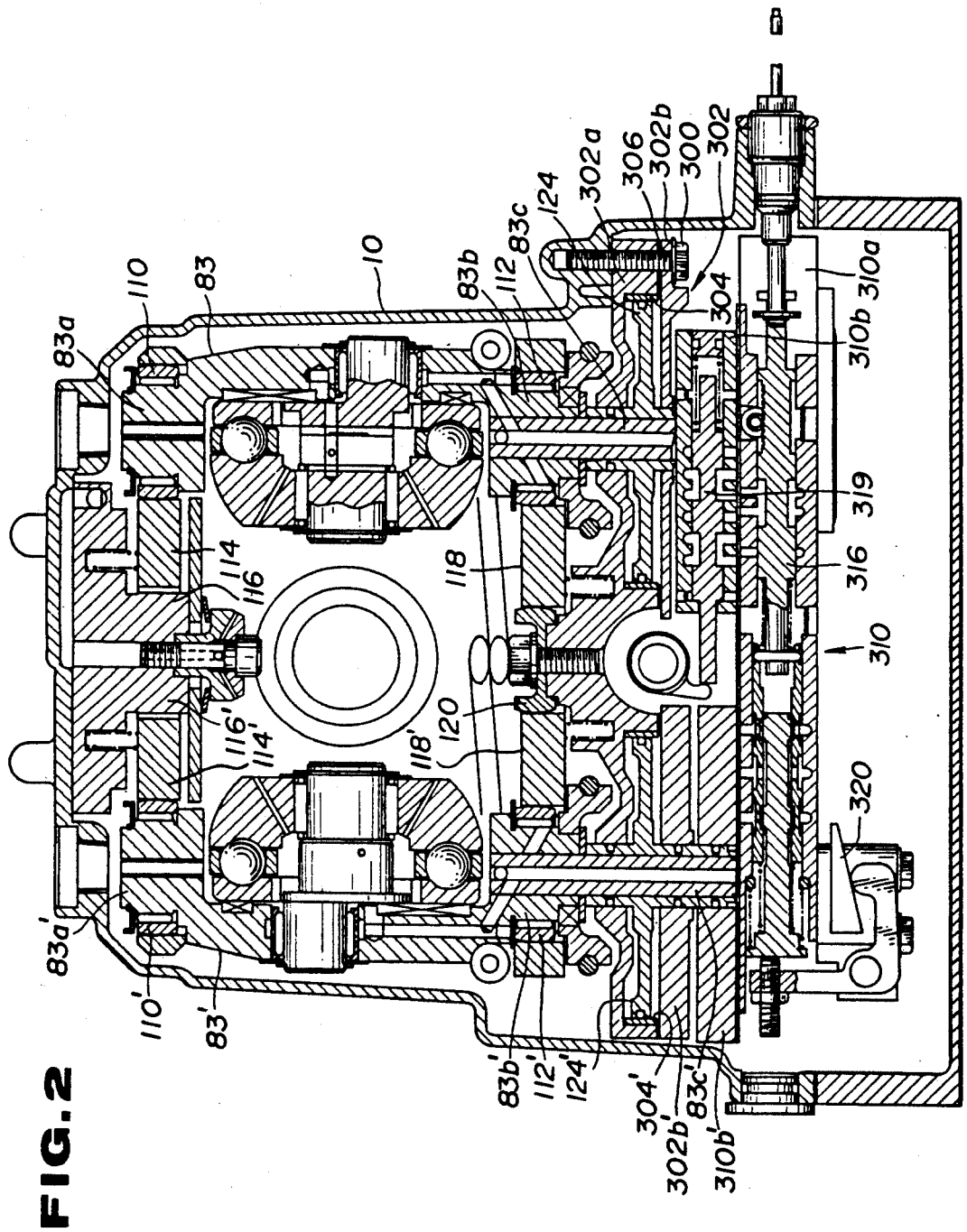
FIG. 2 is a cross section taken along the line II—II of FIG. 2.
Figure 3:
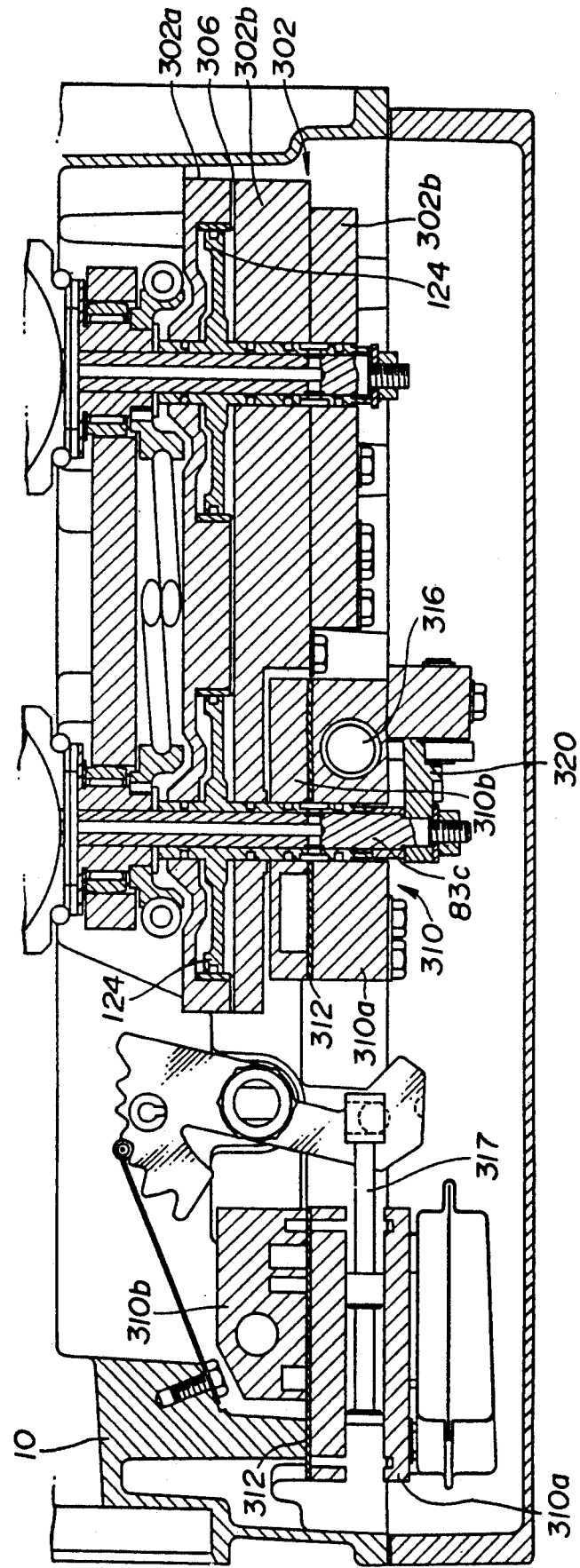
FIG. 3 is a view similar to FIG. 1, taken along the line III—III of FIG. 4.
Figure 4:
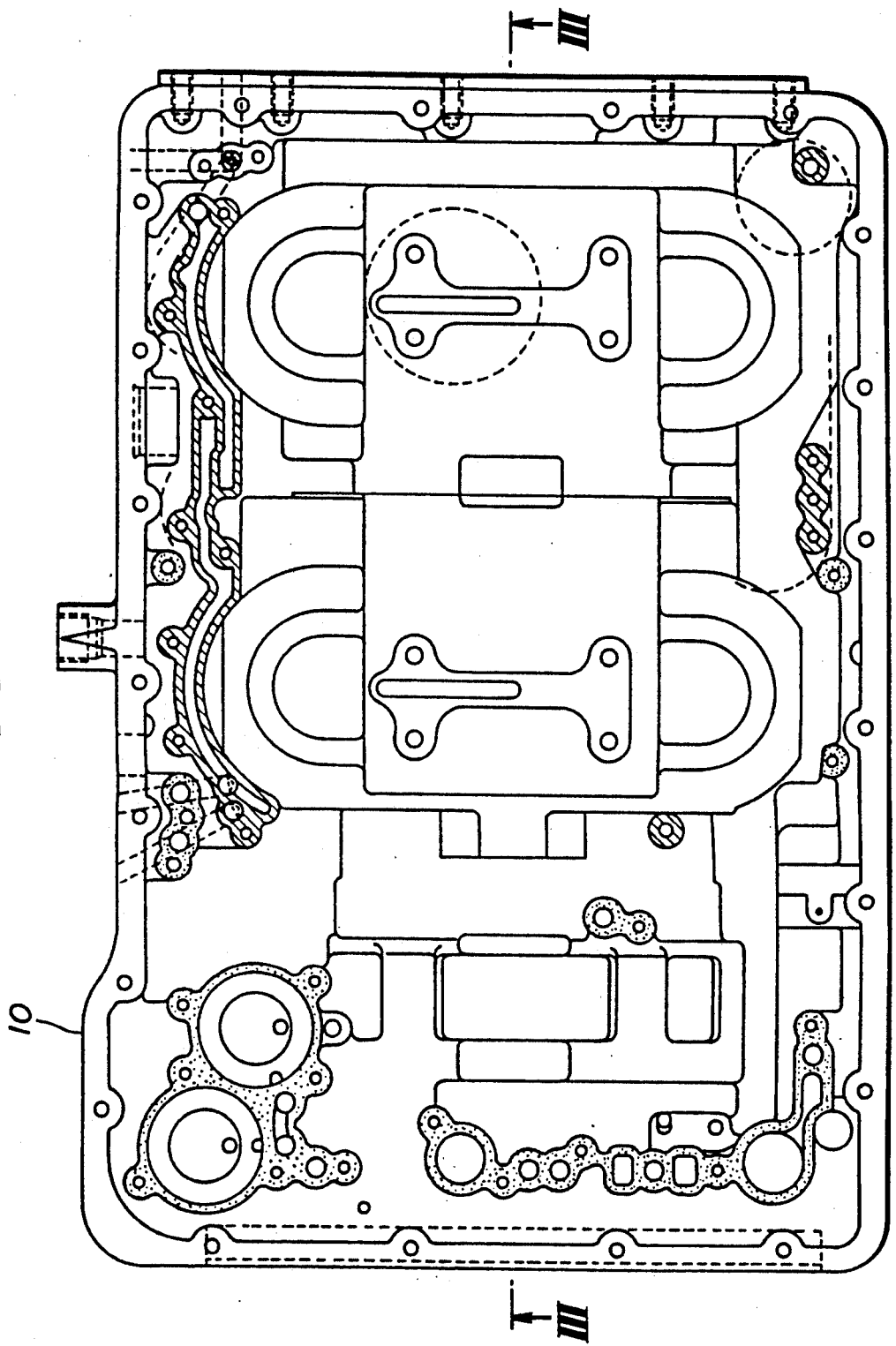
FIG. 4 is a bottom view illustrating a casing of the continuously variable traction roller transmission as shown in FIG. 1.

Referring to FIG. 2, there is shown a cross section of the first and second continuously variable transmission units 22 and 24. It is to be noted that the second continuously variable transmission unit 24 is substantially the same in structure as the first continuously variable transmission unit 22. The parallel structures for transmission unit 24, will be denoted by the "'" symbol. Each roller supporting member 83, 83' is rotatably and vertically movably supported at upper and lower rotation shanks 83a, 83a and 83b, 83b by two spherical bearings 110, 110' and 112. The spherical bearing 110 is supported by a link 114, 114' which is in turn supported by a link post 116, 116' fixed to the casing 10. Similarly, the spherical bearing 112, 112' is supported by a link 118, 118' which is in turn supported by a link post 120. The roller supporting member 83, 83c' includes an extension shank 83c which is arranged to be concentric with the rotation shank 83b, 83b'. The extension shank 83c, 83c' is so constructed as to make unitary rotation with the rotation shank 83b, 83b'. A piston 124 is arranged to the extension shank 83c at the outer periphery thereof. The piston 124, 124' is inserted in a piston bore 304, 304' formed with a main cylinder body 302a which is mounted to the casing 10 by a bolt 300. Mounted to the main cylinder body 302a at the bottom thereof is an auxiliary cylinder body 302b, 302b' which is screwed thereto through a separate plate 306 by the aforementioned bolt 300. The cylinder body 302 is constucted by the main cylinder body 302a, and the auxiliary cylinder body 302b. Thus, two hydraulic chambers are defined in the cylinder body 302 by the piston 124 which is vertically movable by hydraulic pressure operating thereon. A hydraulic cylinder apparatus is defined by the piston 124, and the piston bore 304 of the main cylinder body 302a. Referring to FIG. 4, there is shown the casing 10 as viewed from the bottom thereof. The main cylinder body 302a is mounted to the casing 10 on a bottom portion thereof having a cross-hatching in FIG. 4. Additionally, a valve body 310a is mounted to the casing 10 on a bottom portion thereof having a plurality of points in FIG. 4 (see also FIG. 3). Referring to FIGS. 2 and 3, an auxiliary valve body 310b is mounted to the main valve body 310a on the top thereof through a separate plate 312. The valve body 310 is constructed by the main valve body 310a, and the auxiliary valve body 310b. Received in the main valve body 310a are a spool 316 of a shift control valve, a spool 317 of a manual valve, and the other spools (not shown). Similarly, a spool 319 of the other valve is received in the auxiliary valve body 310b. A control valve arrangement is constructed by the valve body 310, the spools received therein, etc. As shown in FIGS. 2 and 3, the cylinder body 302 and the valve body 310 are mounted to the casing 10 separately, and not connected directly to each other. The extension shank 83c on the left as viewed in FIG. 3 is arranged to penetrate the main valve body 310a, and the auxiliary valve body 310b, and has a cam 320 at the lower end thereof, thereby to feed-back a gear ratio to the shift control valve.

Next, the operation of the first preferred embodiment will be described. When the piston 124 is urged to vertically move by controlling hydraulic pressure within the two chambers defined in the cylinder body 302, the direction of a force which operates on the traction rollers 30 and 36 in a direction of tangent line is turned, rotating each roller supporting member 83 on the rotation shanks 83a and 83b, resulting in shifting. Upon shifting, the two chambers as defined in the cylinder body 302 undergoes high hydraulic pressure in such a manner, causing elastic deformation of the cylinder body 302. However, since the valve body 310 is not connected directly to the cylinder body 302, deformation of the cylinder body 302 fails to affect the valve body 310. Accordingly, the valve body 310 may not be deformed, preventing sticking of the spool(s) received therein.

Figure 5:
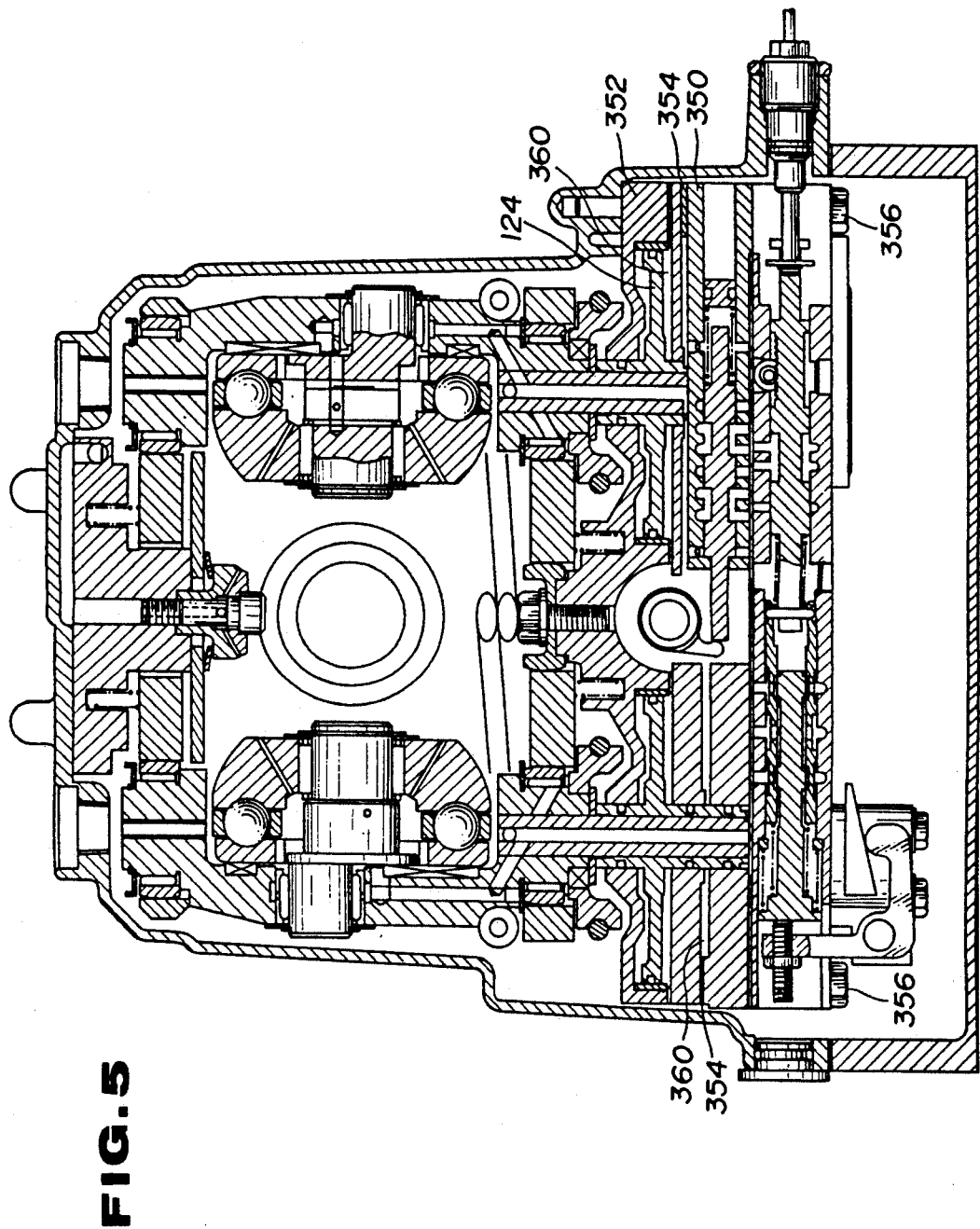
FIG. 5 is a view similar to FIG. 2, illustrating a second preferred embodiment of a continuously variable traction roller transmission according to the present invention.

Referring to FIG. 5, in a second preferred embodiment, a valve body 350 and a cylinder body 352 are connected to each other by a bolt 356 which is arranged to penetrate the two through a separate plate 354. It is to be noted that the separate plate 354 has a bore to correspond to a portion of the cylinder body 352 receiving the piston 124. With regard to this portion, either the cylinder body 352 or the valve body 350 has a recess to define a clearance between the two. That is, the cylinder body 352 and the valve body 350 are connected so that deformation of the cylinder body 352 by hydraulic pressure within the two chambers as defined in the cylinder body 352 fails to affect the valve body 350. Accordingly, in this second preferred embodiment, also, the valve body 350 may not be deformed, resulting in prevention of valve sticking.

What is claimed is:

1. A continuously variable traction roller transmission comprising:

a casing;

input and output discs disposed within said casing;

a pair of traction rollers arranged between a toroidal concavity defined by said input and output discs for frictional engagement therewith;

a pair of roller supporting members for said pair of traction rollers, each having a rotation shank and being rotatable thereon and movable in an axial direction thereof;

hydraulic cylinder means for moving each of said pair of roller supporting members in said axial direction of said rotation shanks;

a cylinder body fixedly mounted to said casing for receiving said hydraulic cylinder means, control valve means for adjusting hydraulic pressure to be supplied to said hydraulic cylinder means, said control valve means being movable in a direction perpendicular to said axial direction of said rotation shank;

a valve body fixedly mounted to said casing for receiving said control valve means, said valve body being adjacent to said cylinder body, and a cam arranged to be adjacent to said valve body.

2. A continuously variable traction roller transmission, comprising:

casing;

input and output discs disposed within said casing;

a pair of traction rollers arranged between a toroidal concavity defined by said input and output discs for frictional engagement therewith;

a pair of roller supporting members for said pair of traction rollers, each having a rotation shank and being rotatable thereon and movable in an axial direction thereof;

hydraulic cylinder means for moving each of said pair of roller supporting members in said axial direction of said rotation shanks;

a cylinder body fixedly mounted to said casing for receiving said hydraulic cylinder means said cylinder body being formed with a piston bore, control valve means for adjusting hydraulic pressure to be supplied to said hydraulic cylinder means, said control valve means being movable in a direction perpendicular to said axial direction of said rotation shank;

a valve body fixedly mounted to said casing for receiving said control valve means, said valve body being adjacent to said cylinder body;

a cam arranged to be adjacent to said valve body and;

clearance defining means for a clearance between said cylinder body and said valve body in the vicinity of said piston bore of said cylinder body.

3. A continuously variable traction roller transmission as claimed in claim 2, wherein said clearance defining means include said cylinder body having a recess.

4. A continuously variable traction roller transmission as claimed in claim 2, wherein said clearance defining means include said valve body having a recess.

* * * * *